United States Patent [19]

Horikoshi

[11] Patent Number: 4,792,438
[45] Date of Patent: Dec. 20, 1988

[54] ROTARY TYPE OZONIZER

[75] Inventor: Kuniaki Horikoshi, Kiryu, Japan

[73] Assignees: Inpal Co., Ltd., Kiryu; Toyo Element Industry Co., Ltd., Kawasaki, both of Japan

[21] Appl. No.: 123,580

[22] Filed: Nov. 20, 1987

[30] Foreign Application Priority Data

Nov. 25, 1986 [JP] Japan .................................. 61-280229

[51] Int. Cl.⁴ ........................ B01J 19/08; C01B 13/11
[52] U.S. Cl. .......................... 422/186.13; 422/186.14; 422/186.07; 210/760; 204/176
[58] Field of Search .................... 422/186.07, 186.13, 422/186.18, 186.26, 186.14; 204/176; 210/760

[56] References Cited

U.S. PATENT DOCUMENTS

| 978,786 | 12/1910 | Small | 422/186.07 |
| 1,082,529 | 12/1913 | Island | 422/186.07 |
| 2,159,206 | 5/1939 | Daily | 422/186.07 |
| 4,282,172 | 8/1981 | McKnight | 422/186.07 |
| 4,386,055 | 5/1983 | McBride | 422/186.07 |

Primary Examiner—John F. Terapane
Assistant Examiner—Susan Wolffe
Attorney, Agent, or Firm—Ladas & Parry

[57] ABSTRACT

A rotary ozonizer has a base, a disk-shaped stationary electrode mounted on the base, and a rotary electrode unit disposed over the stationary electrode in face-to-face relation to form an electric discharge clearance. The rotary electrode unit comprises a plurality of radially outwardly extending arms, and upstanding blades fixed to the radially outer portions of the arms, respectively. When the rotary electrode unit is rotated about a vertical axis by a motor and a high voltage is applied between the electrode and electrode unit, an electric discharge takes place to ozonize the oxygen in said electric discharge clearance, and the thus produced ozone is supplied by the blades out of the ozonizer.

7 Claims, 2 Drawing Sheets

ROTARY TYPE OZONIZER

BACKGROUND OF THE INVENTION

The present invention relates to a rotary type ozone generating device or ozonizer adapted for use, for instance, in a small refrigerator or the like.

A typical conventional rotary ozonizer is disclosed in Japanese Patent Publication (Kokoku) No. 61-29882 published July 10, 1986. The ozonizer is disposed horizontally and compressed air is generated by a centrifugal fan or Sirocco fan mounted on one side of a motor and is introduced into an ozonizer zone on the other side of the motor remote from the Sirocco fan.

The ozonizing zone comprises a cylindrical stationary electrode and a rotary electrode which is driven by the motor and is disposed within the stationary electrode. An electric discharge space is defined between the two electrodes in such a way that the generated ozone is discharged to the exterior.

However, the ozonizer of the type described above has problems in that since the ozonizing zone is disposed horizontally independently of the horizontally disposed Sirocco fan, the entire ozonizer is large in size, and, furthermore, since the stationary and rotary electrodes in the ozonizing zone are in the form of a cylindrical unit, the diameter of one of the electrodes must be varied in order to adjust the clearance between them (the electric discharge clearance) so that the ozonizer is expensive in cost.

SUMMARY OF THE INVENTION

It is the object of the present invention to provide a rotary type ozonizer which can be made smaller in size than the conventional ozonizer and in which the clearance between the stationary and rotary electrodes can be adjusted easily.

According to the present invention, there is provided a rotary type ozonizer in which a disk-shaped stationary electrode and a rotary electrode equipped with blowing fans are disposed in vertically opposed relationship with each other and are spaced from each other by a suitable distance; the rotary electrode is operatively coupled to, and rotated by the shaft of a motor; and a high voltage is applied between the stationary and rotary electrodes.

When the rotary electrode equipped with the blowing blades or fans is rotated by the motor, the surrounding air is fed into the space defined between the vertically opposing electrodes and electric discharge takes place therebetween while generated ozone is agitated and scattered by the blowing fans. Since the motor, and the rotary and stationary electrodes are disposed one above the other as described above, not only the electric discharge space defined between the stationary and rotary electrodes can be adjusted in a simple manner but also the ozonizer can be made compact in size because the rotary electrode functions also as means for moving the air.

The above and other objects, effects and features of the present invention will become more apparent from the following description of preferred embodiments thereof taken in conjunction with the accompanying drawings.

DESCRIPTION OF PREFERRED EMBODIMENTS

Figure 1:
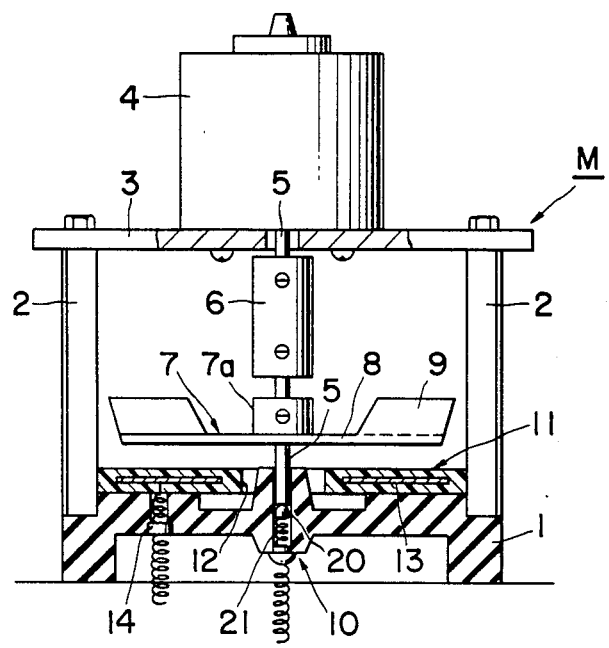
FIG. 1 is a front view, partly in vertical section, of a rotary type ozonizer in accordance with the present invention.
Figure 2:
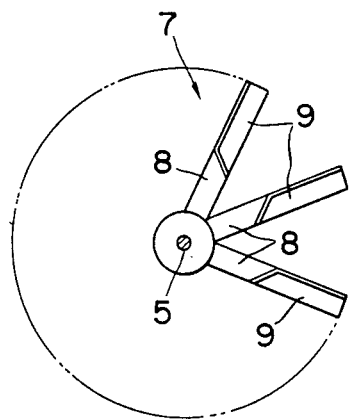
FIG. 2 is a partial top view of a rotary electrode thereof.

Referring first to FIG. 1, a rotary ozonizer in accordance with the present invention and generally indicated by M has a base 1 made of an electrically insulating material. Supporting columns 2 are disposed upright around the base 1 to support a horizontal supporting plate 3. A motor 4 such as a DC motor or a pneumatic motor is mounted on the center portion of the supporting plate 3 in such a way that its output shaft 5 extends downwards. The motor shaft 5 has an electrically insulating pillar 6 disposed intermediate its ends, and a rotary electrode unit 7 as best shown in FIG. 2 is joined securely to the shaft 5 below the insulating pillar 6. The unit 7 has a hub 7a fitted on the shaft 5 adjustably therealong. The rotary electrode unit 7 has a plurality of rotary electric discharge arms of planar shape extending radially outwardly from the center thereof and an upstanding blade 9 is formed on the radially outer portion of each of the discharge arms 8.

The lower end of the motor shaft 5 is rotatably supported in the center of the base 1 and is electrically connected to a high-voltage power supply 10 through a carbon contact 20 biased upwardly by a coil spring 21.

Figure 3:
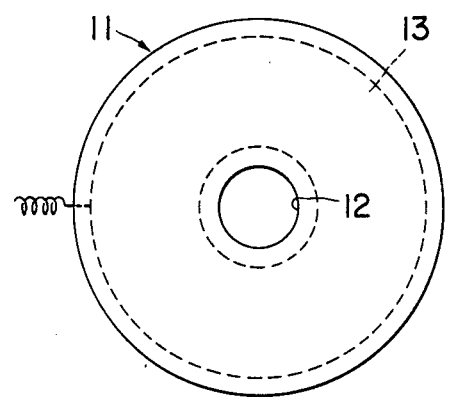
FIG. 3 is a top view of a stationary electrode thereof.

A disk-shaped stationary electrode 11 as best shown in plan view in FIG. 3 is mounted on the base 1 in vertically opposing relationship with the rotary electrode unit 7 and has a circular hole 12 in the center thereof into which extends the upwardly protruding center portion of the base 1. The stationary electrode 11 has an electrically insulating main body made of silicone, Teflon (Trademark) or the like in which is embedded an annular conductor plate 13 made of a stainless steel or the like. The conductor plate 13 is applied with a high voltage from a high-voltage power supply 14 disposed on the lower surface of the base 1.

When the motor 4 is energized, the rotary electrode unit 7 is rotated so that an electric discharge takes place between the rotary electrode unit 7 and the stationary electrode 11 so that ozone is generated and is agitated and scattered by the blades 9. It will be understood that a large quantity of air is induced into the discharge space defined between the stationary and rotary electrodes 7 and 11 by the blades 9 so that positive ozone generation or ozonization is ensured.

Figure 4:
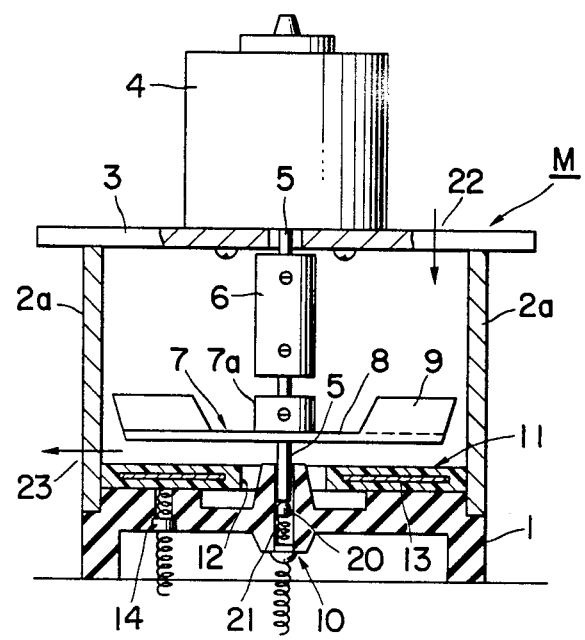
FIG. 4 is a view similar to FIG. 1, but showing a modified ozonizer.

In this embodiment, the stationary and rotary electrodes 11 and 7 have been described as being disposed in the open frame as shown in FIG. 1, but it is to be understood that, as shown in FIG. 4, they may be disposed in an enclosed casing made from the top plate 3, the base 1 and a cylindrical side wall 2a. In this modification, the casing must be provided with an air inlet 22 and an ozone outlet 23.

As described above, according to the present invention, the motor, the rotary electrode unit and the stationary electrode are disposed one upon the other and the rotary electrode unit is equipped with a plurality of blades so that it is not needed to install an independent centrifugal fan. Furthermore, the stationary electrode can be made in the form of a flat plate and also the discharge surface of the rotary electrode unit can be made in the form of a flat plate. Therefore, according to the present invention, the adjustment of the width of the electric discharge clearance can be made in a far simple manner and the ozonizer can be made compact in size as a whole.

What is claimed is:

1. A rotary type ozonizer, comprising: a base; a disk-shaped stationary electrode provided horizontally on said base; a rotary electrode equipped with a plurality of air driving blades and disposed in vertically opposing relationship relative to said stationary electrode to form between the two electrodes an electric discharge clearance; motor means for driving said rotary electrode in rotation; and means for applying a high voltage between said stationary and rotary electrodes.

2. A rotary type ozonizer as set forth in claim 1, wherein said stationary electrode is fixed on said base; said rotary electrode is disposed over the stationary electrode; and said driving means is mounted over the rotary electrode and coupled with the latter through a rotary shaft.

3. A rotary type ozonizer as set forth in claim 2, wherein said driving means is mounted on a horizontal supporting plate which is connected to said base through supporting columns.

4. A rotary type ozonizer as set forth in claim 1, wherein said rotary electrode comprises a central hub, and a plurality of arms extending radially outwards from the hub, said blades being provided on the radially outer end portion of the arms.

5. A rotary type ozonizer as set forth in claim 4, wherein said blades are upstanding blades.

6. A rotary type ozonizer as set forth in claim 1, wherein said stationary electrode is made of a body of an electrically insulating material, and an annular conductor plate embedded therein.

7. A rotary type ozonizer as set forth in claim 1, wherein said stationary and rotary electrodes are enclosed in a closed casing having an air inlet and an ozone outlet.

* * * * *